United States Patent Office 3,567,318
Patented Mar. 2, 1971

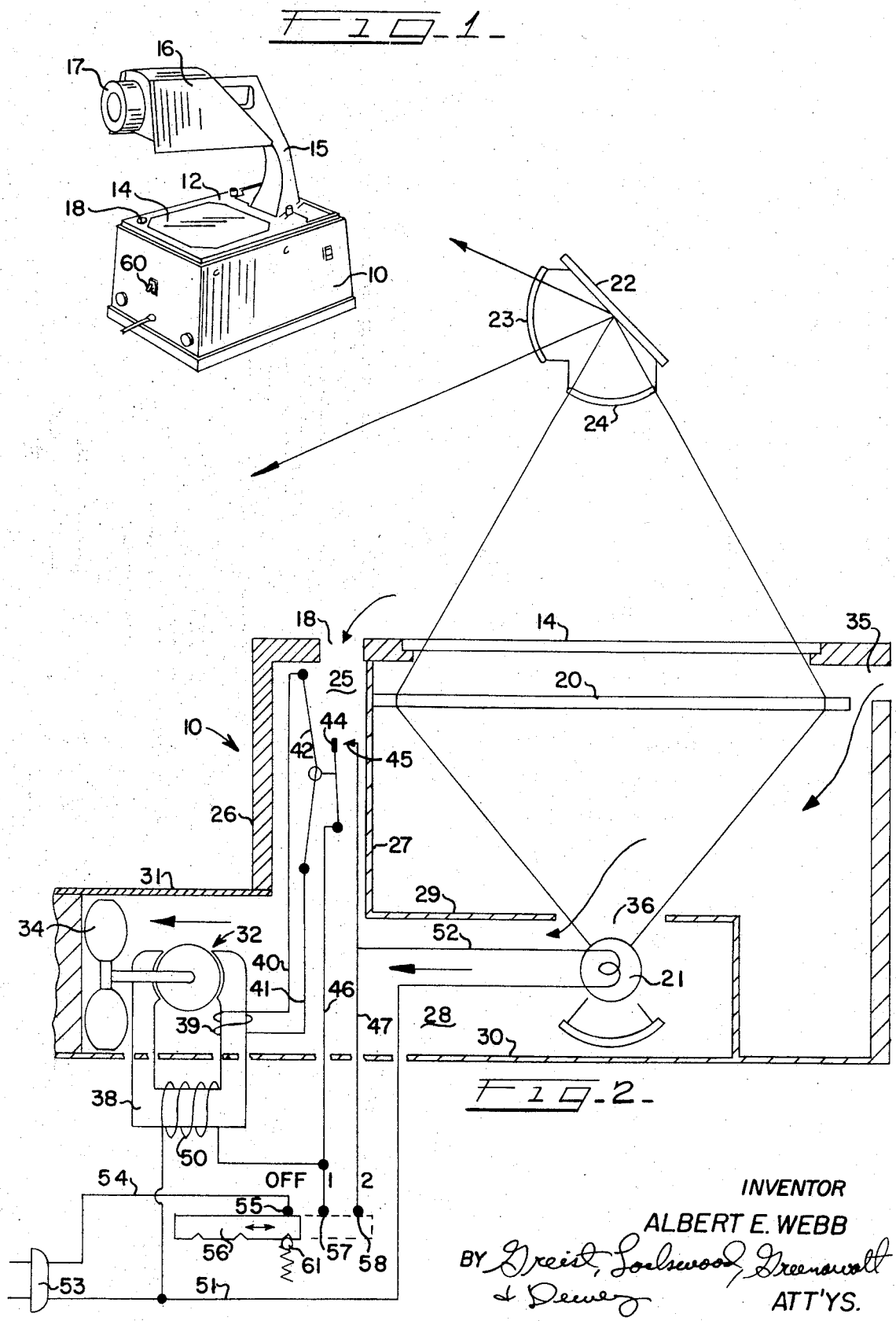

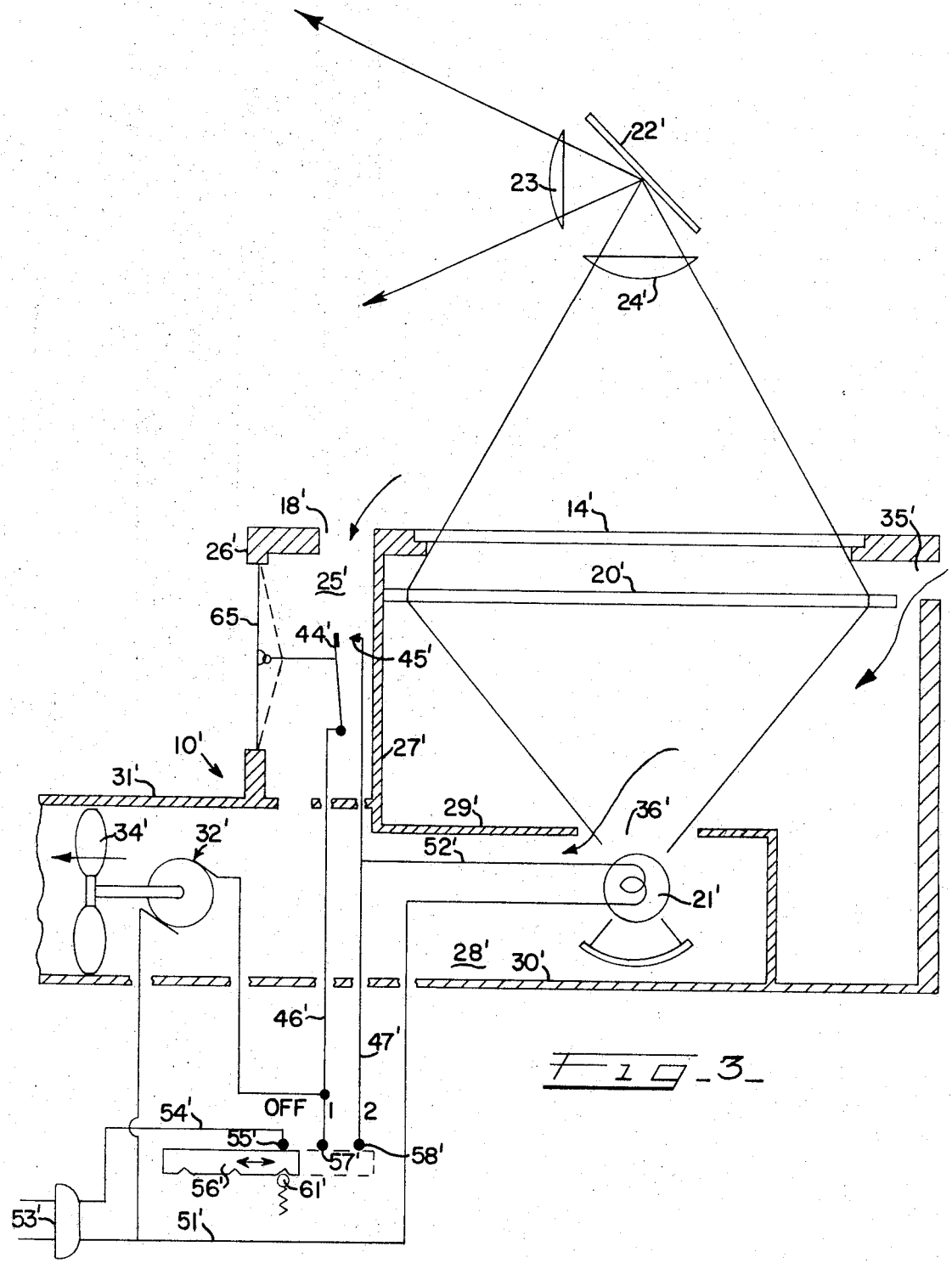

3,567,318
LAMP ACTUATING MEANS FOR AN OVERHEAD PROJECTOR
Albert E. Webb, Glenview, Ill., assignor to
GAF Corporation, New York, N.Y.
Filed June 17, 1968, Ser. No. 737,650
Int. Cl. G03b 21/20
U.S. Cl. 353—85                                    7 Claims

ABSTRACT OF THE DISCLOSURE

The projector includes a chamber and an air inlet opening communicating this chamber with the face of the platen. The inlet opening is arranged to be covered and substantially closed by the transparency member when the latter is placed into operative position on the projector. A fan draws air into the chamber through the inlet opening. In one embodiment, a heat sensitive relay is mounted in the chamber, such relay being adapted to actuate the lamp switch. A reduction in the air flow into said chamber resulting from placement of the transparency member into operative position causes an increase in the temperature in the chamber thereby to actuate the relay and close the switch in the lamp circuit. In another embodiment, a diaphragm is mounted in said chamber and associated with the lamp switch. A reduction in the pressure in said chamber occasioned by placement of the transparency member into operative position causes the diaphragm to expand and close the switch for energizing the lamp.

BACKGROUND OF THE INVENTION

The present invention relates to overhead projectors and more particularly to a unique switch actuating arrangement which automatically brings about energization of the projection lamp in response to physical placement of the transparency member on the projector platen. As is known to those skilled in the art, overhead projectors have a horizontally disposed platen or projection stage on which the transparency member is placed for projection of the image thereon. This platen consists of a transparent glass plate under which a Fresnel lens is mounted, the projection lamp being mounted beneath the Fresnel lens. A lens and mirror arrangement is mounted in vertical spaced relation from the platen for projecting the image on a screen remote from the projector.

A switch is provided for turning the projection lamp off between successive showing of slides in order that the screen will not be illuminated with a brilliant flash of light when a transparency member is removed from the projector platen. It is desirable to provide automatic means for turning the projection lamp on and off during showing of successive transparencies in order to make it unnecessary for the operator to turn the lamp on and off by manually operating the switch.

Prior arrangements for automatically turning the projection lamp on and off in response to placement of the transparency member on the platen have included buttons, rollers and fingers, etc., which are physically engaged by the transparency member to actuate a switch in the lamp circuit. These forms of switch actuators are not desirable since they include a member extending above the projector platen, which member is likely to be bent or otherwise damaged. Another prior arrangement for automatically operating the projection lamp includes magnetic actuating means which include a metallic member secured to the holder or frame for the transparency. This form of actuating means has a disadvantage in that it requires the transparency mount or frame to be of special construction. The present invention has to do with unique actuating means for automatically energizing the projection lamp in response to placement of the transparency member on the platen, which actuating means possess many advantages and do not have the undesirable characteristics of the aforementioned prior art arrangements.

OBJECTS OF THE INVENTION

A primary object of the present invention is the provision of new and improved means for automatically energizing an overhead projector lamp in response to placement of the transparency member into operative position on the platen, wherein such means do not require the use of actuating fingers or buttons extending above the platen and which means do not require the transparency member to be of special construction.

Another object of the present invention is the provision of new and improved pneumatic means for automatically energizing the projection lamp in an overhead projector, such pneumatic means being actuated by the act of physically placing the transparency member on the projector platen.

Still another object of the present invention is the provision of projector lamp actuating means of the type described, which means include an air inlet opening formed in the projector platen and arranged to be covered and substantially closed by the transparency member when the latter is placed into operative position.

Another object of the present invention is the provision of lamp actuating means according to the foregoing object wherein the actuating means include a heat sensitive relay.

Another object of the present invention is the provision of automatic actuating means for an overhead projector, wherein such actuating means include a diaphragm which is actuated by a reduction in air flow through an inlet opening formed in the projector platen and arranged so as to be covered by the transparency member when the latter is placed into operative position on the projector platen.

These and other objects and advantages of the invention will become apparent from the following specification disclosing preferred embodiments shown in the accompanying drawings.

DESCRIPTION OF THE DRAWINGS

FIG. 1 is a perspective view of an overhead projector embodying the present invention;

FIG. 2 is a vertical section, largely schematic, taken through an overhead projector of the type shown in FIG. 1; and FIG. 3 is a vertical section similar to FIG. 2 and showing another form or embodiment of the present invention.

DESCRIPTION OF PREFERRED EMBODIMENTS

The overhead projector includes a base 10 having a horizontally disposed platen defined by a plate 12 which includes a window in which is mounted a translucent glass plate 14. The base 10 mounts an upright member 15 which in turn mounts a housing 16 containing a lens assembly 17 for directing a beam of light to a remote projection screen. According to the present invention, the plate includes an air inlet opening or port 18 adjacent the edge of the glass plate 14.

The projector housing 10 mounts a Fresnel lens 20 in parallel spaced relation beneath the plate 14. A projection lamp 21 is suitably mounted beneath the Fresnel lens 20. The housing 16 mounts a mirror 22 and lenses 23, 24 all in accordance with a known practice.

The inlet opening 18 is in communication with a chamber 25 defined by housing walls 26, 27. The chamber 25 is in communication with a passageway 28, the latter being defined by duct plates 29, 30, 31. A motor 32 is mounted in the passageway 28, such motor driving a cooling fan 34 which forces air in the direction of the arrow. This fan draws air into an opening 35 and then through an aperture 36 in the duct 29 for cooling the projection lamp 21, the air being exhausted through a suitable outlet (not shown). The fan also draws air into the chamber 25 through the inlet 18.

The motor 32 is of the shaded-pole type and includes field laminations 38. A low voltage transformer is defined by windings 39 connected to conductors 40, 41; these conductors are connected with opposite ends of a hot wire relay 42. It will be understood the wire 42 is of the type adapted to elongate or expand as it is heated in response to the passage of current therethrough. The wire 42 is connected to a movable contact 44 for moving the latter to the right into engagement with a fixed contact 45 upon sufficient heating of the wire 42. The contacts 44, 45 are respectively connected to conductors 46, 47.

Shade pole motor field winding 50 is connected to the conductor 46 and to a conductor 51, the latter extending between one terminal of a plug 53 and one terminal of the projection lamp 21. The other lamp terminal is connected by a line 52 to the conductor 47. The plug 53 is of the usual type for connection with a socket to energize the overhead projector from house or line current. The other terminal of the plug 53 is connected to a conductor 54 which extends to a fixed contact 55. The contact 55 is arranged to be engaged by the movable contact bar 56, this bar being arranged to be moved in the direction of the arrows for selective bridging of the contacts 55, 57 and 58. As noted, the contacts 57, 58 are respectively connected to conductors 46, 47. The movable contact bar 56 together with the three fixed contacts define a three-position switch operated by a button 60 (FIG. 1). Suitable means including a spring-biased detent ball 61 are provided to detent the switch in each of the three positions which may be labeled as "off," "automatic" and "manual."

When the bar 56 is moved to bridge the contacts 55, 57, the fan motor 32 will be energized for drawing cooling air across the projection lamp 21 and also for drawing air into the compartment 25 through the inlet opening 18. Current will also be passed through the wire 42 for heating the same. However, the air entering the opening 18 passes over wire 42 with sufficient velocity that the wire is cooled and does not expand to a degree such that it will move the contact 44 into engagement with the contact 45. When a transparency member is placed into operative position on the platen of a projector, the transparency itself or its mount or holder covers the opening 18 substantially closing the same and thereby reducing, if not entirely preventing, the flow of air through the chamber 25. Wire 42, in still air, quickly heats and expands resulting in the latter expanding to a degree to bring about engagement of the contacts 44, 45 and thereby complete a circuit to the projection lamp 21 through conductors 51, 52, contacts 44, 45, conductor 46, bar 56 and conductor 54. As soon as the transparency member is removed from the platen, air will again be drawn through the opening 18 to cool the wire 42 and bring about opening of the contacts 44, 45 for de-energizing the projection lamp.

Another embodiment or modification of the invention is shown in FIG. 3. The essential difference between this embodiment and the embodiment just described resides in the substitution of a diaphragm for the hot wire relay member 42. The parts in the embodiment according to FIG. 3 which corresponds to the parts of the embodiment just described are indicated by the prime form of numeral.

The wall 26' of the chamber 25' has an opening with a diaphragm 65 mounted therein. This diaphragm is connected to the movable contact 44' and normally holds the latter separated from the fixed contact 45'. When the transparency member is placed on the platen for covering and substantially closing the inlet opening 18', the fan 34' brings about a reduction in pressure in the chamber 25' thereby causing the diaphragm to move to the broken line position shown; this results in closing of the contacts 44', 45' thereby energizing the projection lamp 21'. When the transparency member is removed from the platen, air flow through the inlet opening 18' will again be resumed increasing the pressure therein for returning the diaphragm to the solid line position thereby opening the contacts 44', 45', and de-energizing the projection lamp 21'.

Should it be desired to maintain the projection lamp in an energized state, or to accommodate transparencies too small to cover opening 18, the contact bar 56 is moved to the right for bridging the contacts 55, 58. Both the projection lamp 21 and the fan motor 32 are de-energized by moving the contact bar 56 to the "off" position illustrated in solid lines in the drawings.

It is thus seen that according to the present invention, unique means are provided for automatically energizing the projection lamp in response to physical placement of the transparency member on the projector platen. The inlet opening 18 is positioned to be covered either by the transparency itself or its mount or frame. Of course, the opening 18 could be formed in the glass plate 14 as well as the housing plate 12. The transparency member need not be of special construction for operating the switch actuating means of the present invention, and no means whatsoever in the nature of fingers or buttons project above the platen of the projector housing 10.

I claim:

1. An overhead projector of the type including a platen against which a transparency member is placed for projecting an image thereon, wherein such projector includes a lamp and a circuit therefor, which circuit includes a switch actuated by placement of the transparency member into operative position on such platen, the improvement in said projector comprising, said platen having a port in the face thereof, pneumatic means communicating with said port for actuating said switch, said pneumatic means being actuated solely in response to placement of the transparency member into operative position on said platen and in covering relation with said port.

2. The improvement according to claim 1 wherein said pneumatic means includes a heat sensitive member which expands as a result of a reduction in air flow through said inlet port occasioned by covering of the latter by said transparency member.

3. The improvement according to claim 1 wherein said pneumatic means includes a diaphragm which expands as a result of a reduction in air flow through said inlet port occasioned by covering of the latter by said transparency member.

4. In an overhead projector of the type having a projection lamp and a platen against which a transparency member is placed for projecting an image thereon, the improvement comprising, a circuit for energizing said lamp, which circuit includes normally open contacts, said projector includes means defining a chamber, said platen including an opening communicating said chamber with the face of said platen, means for drawing air into said chamber through said opening, actuating means in said chamber responsive to a reduction in the air flow into said chamber from said opening to close said contacts and thereby energize said lamp, said opening being arranged to be covered and substantially closed by said transparency member when the same is placed on said platen thereby automatically to energize said lamp.

5. The improvement according to claim 4 wherein said actuating means include a thermal relay in said chamber which operates to close said contacts in response to an increase in its temperature occasioned by a reduction in the air flow into said chamber.

6. The improvement according to claim 4 wherein said actuating means include a diaphragm in said chamber which operates to close said contacts in response to a drop in the pressure in said chamber occasioned by a reduction in the air flow thereinto.

7. The improvement according to claim 4 wherein said means for drawing air into said chamber includes a fan, duct means extending between said lamp and said fan thereby allowing the latter to cool the former, said duct means also communicating with said chamber.

References Cited

UNITED STATES PATENTS

| 2,592,834 | 4/1952 | Tiffany | 337—395(X) |
| 3,190,174 | 6/1965 | Field | 353—85 |

WILLIAM D. MARTIN, JR., Primary Examiner

U.S. Cl. X.R.

337—395; 353—57